(12) United States Patent
Gadde et al.

(10) Patent No.: US 6,715,295 B2
(45) Date of Patent: Apr. 6, 2004

(54) GAS TURBINE PILOT BURNER WATER INJECTION AND METHOD OF OPERATION

(75) Inventors: Satish Gadde, Orlando, FL (US); Thomas J. Gordon, Winter Springs, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 8 days.

(21) Appl. No.: 10/152,518

(22) Filed: May 22, 2002

(65) Prior Publication Data

US 2003/0217553 A1 Nov. 27, 2003

(51) Int. Cl.[7] .................................................. F02C 3/30
(52) U.S. Cl. ......................... 60/775; 60/39.3; 60/39.55
(58) Field of Search ............................... 60/775, 39.55, 60/39.58, 39.3

(56) References Cited

U.S. PATENT DOCUMENTS

| | | |
|---|---|---|
| 2,863,282 A | 12/1958 | Torell |
| 3,038,308 A | 6/1962 | Fuller |
| 3,100,964 A | 8/1963 | Bevers et al. |
| 3,353,360 A | 11/1967 | Gorzegno |
| 3,693,347 A | 9/1972 | Kydd et al. |
| 3,826,080 A | 7/1974 | DeCorso et al. |
| 4,160,362 A | 7/1979 | Martens et al. |
| 4,259,837 A | 4/1981 | Russell et al. |
| 4,313,300 A | 2/1982 | Wilkes et al. |
| 4,394,118 A | 7/1983 | Martin |
| 4,418,527 A | 12/1983 | Schlom et al. |
| 4,701,124 A * | 10/1987 | Maghon et al. ............ 60/39.55 |
| 4,710,095 A | 12/1987 | Freberg et al. |
| 4,733,527 A * | 3/1988 | Kidd ............................ 60/775 |
| 4,773,846 A | 9/1988 | Munk |
| 4,808,235 A | 2/1989 | Woodson et al. |
| 4,926,620 A | 5/1990 | Donlee |
| 4,955,191 A * | 9/1990 | Okamoto et al. ............ 60/39.3 |
| 5,011,540 A | 4/1991 | McDermott |
| 5,054,279 A | 10/1991 | Hines |
| 5,259,184 A | 11/1993 | Borkowicz et al. |
| 5,331,806 A | 7/1994 | Warkentin |
| 5,463,873 A | 11/1995 | Early et al. |
| 5,471,831 A | 12/1995 | Rowe |
| 5,867,977 A | 2/1999 | Zachary et al. |
| 5,930,990 A | 8/1999 | Zachary et al. |
| 5,987,875 A * | 11/1999 | Hilburn et al. ................ 60/775 |
| 5,996,351 A | 12/1999 | Feitelberg et al. |
| 6,260,350 B1 | 7/2001 | Horii et al. |

\* cited by examiner

*Primary Examiner*—Michael Koczo

(57) ABSTRACT

A gas turbine engine (12) including a water injection system (56) for providing a flow of water (60) to only a pilot diffusion combustion zone (20) of a dual-mode combustor (10) and not to a pre-mixed combustion zone (18) of the combustor. The selective reduction of peak flame temperature in the pilot flame zone provides a maximum reduction in the production of oxides of nitrogen with a minimum consumption of water. The pilot fuel fraction of the combustor may be increased prior to the initiation of the pilot water injection flow. The flow rate of the pilot injection water may be varied as a function of the power level of the gas turbine, and further as a function of the humidity of the ambient air (36).

7 Claims, 1 Drawing Sheet

US 6,715,295 B2

GAS TURBINE PILOT BURNER WATER INJECTION AND METHOD OF OPERATION

FIELD OF THE INVENTION

This invention relates generally to the field of gas turbine engines, and more particularly to the control of emissions produced by the combustion process within a gas turbine engine.

BACKGROUND OF THE INVENTION

The products of combustion of fossil fuels include carbon dioxide, carbon monoxide, unburnt hydrocarbons and nitrogen oxide (NOx). Various control schemes and hardware configurations have been used to control the concentration of such emissions while at the same time providing fuel-efficient and stable engine operation. Regulatory changes continue to reduce the allowable level of emissions from electric power generating plants utilizing gas turbine engines. Gas turbine power plants in most locations must now be operated to produce no more than 15 ppm NOx, and in some locations, to produce no more than 7 ppm NOx or even 3.5 ppm NOx. Carbon monoxide emission limits can be as low as 10 ppm. To achieve such low levels of emissions, it is necessary to establish and to maintain very lean combustion conditions. Lean combustion is known to be less stable than rich combustion, and lean-burn combustors are more prone to damaging pressure pulsations generated within the combustor. Precise "tuning" of the combustion process is needed to establish a balance between stable combustion and low emissions. A precisely tuned engine may be susceptible to drift over time, with a resulting increase in emissions or an increase in the level of combustion instability.

One known approach to controlling the emissions from a gas turbine power plant is to run the combustor at a relatively rich setting, thereby ensuring stable combustion while generating excessive amounts of undesirable emissions. The exhaust gas is then cleaned to regulatory limits by passing it through a combustion catalyst installed downstream of the combustor in the turbine exhaust system. Alternatively, a catalyst may be used to achieve a majority of the fuel combustion, with only a final portion of the combustion being accomplished in a flame combustor located downstream of the primary catalyst. Catalyst systems are very expensive and are often used as a last resort in especially rigorous regulatory situations.

The generation of NOx emissions is directly related to the peak flame temperature in the combustor. For more than two decades it has been known to control the peak flame temperature in a gas turbine combustor by injecting water into the combustor. The cost of the demineralized water used for water injection can be significant, particularly in areas where the supply of fresh water is limited. Accordingly, it is beneficial to limit the use of injected water to the extent possible. U.S. Pat. No. 4,160,362 dated Jul. 10, 1979, describes a gas turbine power plant having reduced emission of nitrogen oxide. The gas turbine power plant described in that patent includes a system for controlling the amount of water injected into the combustor as a function of gas turbine load corrected for variations in compressor inlet temperature (i.e. ambient temperature) and inlet guide vane position.

SUMMARY OF THE INVENTION

An improved apparatus and method are needed to further reduce the level of emissions in a gas turbine engine. For systems utilizing water injection, a reduced quantity of water consumption is desired.

A method is disclosed herein for use with a dual-mode gas turbine engine combustor having a pre-mixed combustion zone and a pilot diffusion combustion zone. The method for controlling the generation of oxides of nitrogen during operation of the combustor includes selectively injecting water into only the pilot diffusion combustion zone and not into the pre-mixed combustion zone to correspondingly limit combustion temperature in the pilot diffusion combustion zone for controlling the production of oxides of nitrogen in the combustor.

A gas turbine engine having a dual-mode combustor is described herein as including: a pre-mixed combustion zone; a diffusion combustion zone; and a water injection apparatus for selectively injecting water into only the diffusion combustion zone and not the pre-mixed combustion zone for controlling combustion temperature in the diffusion flame zone.

A method for controlling combustion of a fuel in a gas turbine engine having at least two zones of combustion is disclosed herein as including selectively injecting a fluid other than the fuel into only one of the at least two zones and not another of the at least two zones. When the gas turbine engine is a dual-mode gas turbine engine combustor having a pre-mixed combustion zone and a pilot diffusion combustion zone, the method further includes injecting the fluid into only the pilot diffusion combustion zone and not the pre-mixed combustion zone.

BRIEF DESCRIPTION OF THE DRAWINGS

These and other advantages of the invention will be more apparent from the following description in view of the drawings that show.

to FIG. 1 is a partial cross-sectional view of a dual-mode combustor of a gas turbine engine having a pilot flame water injection apparatus.

DETAILED DESCRIPTION OF THE INVENTION

Figure 1:
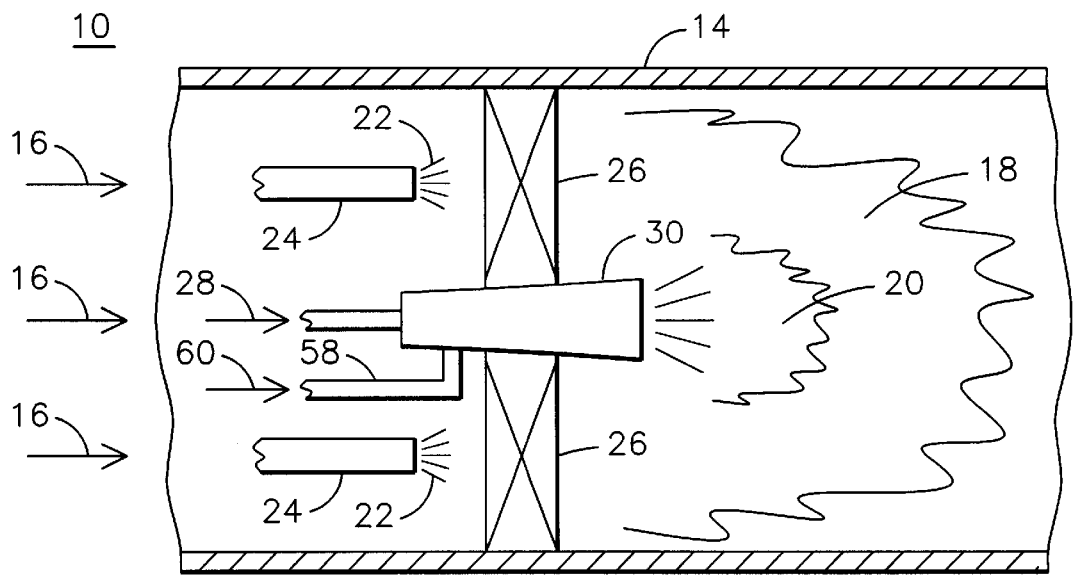

A dual-mode combustor 10 forming a portion of a gas turbine engine 12 is illustrated in partial cross-section in FIG. 1. The combustor 10 includes a generally tubular-shaped wall 14 defining a flow path for combustion air 16. The combustor is called "dual-mode" because it includes two separate, but interacting, combustion zones; a pre-mixed combustion zone 18 and a diffusion combustion zone 20. Dual-mode combustors are known in the art and are sold by the assignee of the present invention under the trademarks W501 G, W501 FD I, W501 FD II, W501 FC, W501 D5A, W501 D5 and W251 B12 A. As the name implies, the pre-mixed combustion zone 18 is a volume wherein a pre-mixed combination of fuel and combustion air 16 is combusted. A flow of combustible fuel 22, such as natural gas for example, is delivered via a main fuel tube 24 into the combustion air 16 upstream of a swirler 26. The swirler 26 provides a mixing action that ensures a complete and even distribution of the unburned fuel 22 within combustion air 16. This mixture enters the pre-mixed combustion zone 18 where it is ignited and combusted. A separate supply of combustible fuel 28 is provided through a pilot fuel nozzle 30. The pilot fuel 28 mixes with the incoming combustion air 16 to form a diffusion flame in the diffusion combustion zone 20. It is known in the art to supply a relatively lean fuel/air mixture in the pre-mixed combustion zone 18 in order to reduce the emission of carbon-based compounds from the engine 12. It is also known to provide a relatively rich fuel/air mixture in the pilot diffusion combustion zone 20 to provide stability for the combustion process. The present inventors find that the pilot diffusion flame is a primary source of NOx emissions due to the relatively higher combustion temperature in the diffusion pilot combustion zone 20. The present invention is directed toward the control of NOx emissions through the control of combustion conditions in the pilot diffusion combustion zone 20.

Figure 2:
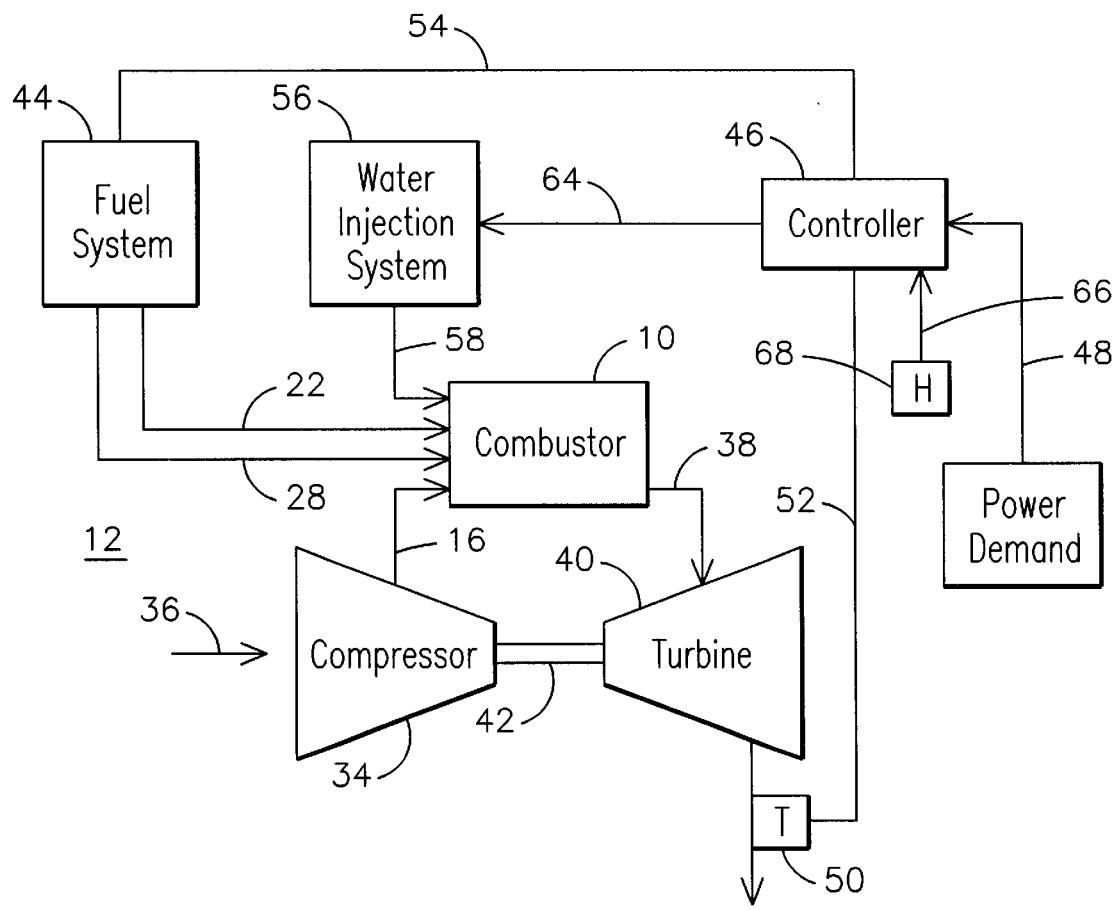
FIG. 2 is a schematic illustration of a gas turbine engine incorporating the combustor of FIG. 1.

FIG. 2 is a schematic illustration of the gas turbine engine 12 including combustor 10. Combustor 10 is provided with a flow of compressed combustion air 16 by compressor 34 which, in turn, receives a supply of ambient air 36. The hot combustion gas 38 exits combustor 10 through a transition piece and is delivered to a turbine 40 where energy is extracted to turn shaft 42. Shaft 42 may be used to power the compressor 34 and auxiliary equipment such as an electrical generator (not shown).

A fuel system 44 provides two separately controllable flows of combustible fuel to the combustor 10; a main fuel flow 22 supplied to the pre-mixed combustion zone 18 and a pilot fuel flow 28 supplied to the pilot diffusion combustion zone 20. The term pilot fuel fraction is known in the art and is defined as the ratio of the fuel flow rate supplied to the pilot diffusion combustion zone 20 divided by a sum of the fuel flow rate supplied to the pilot diffusion combustion zone 20 plus the fuel flow rate supplied to the pre-mixed combustion zone 18.

A controller 46 may be provided in the form of a computer with executable instructions, a digital or analog control system, or other device for receiving input signals and for producing appropriate output signals. One such system is the WDPF/TXP Control System commonly provided with gas turbine-generator packages sold by the assignee of the present invention. Controller 46 receives an operator-selected power demand signal 48 for inputting a desired power level for operation of the engine 12. A turbine exhaust temperature sensor 50 provides an exhaust temperature signal 52 to controller 46 as an indication of the actual engine operating power level. Controller 46 provides fuel system control signal 54 to fuel system 44 for controlling the amount of fuel provided to combustor 10 in response to the power demand signal 48. As is known in the art, the fraction of the total fuel that is provided to the pilot stage, i.e. the pilot fuel fraction, may be controlled to be a predetermined value that is a function of the power level of the combustor.

Gas turbine engine 12 also includes a water injection system 56 for selectively injecting water into only the pilot diffusion combustion zone 20 and not into the pre-mixed combustion zone 18 to correspondingly limit combustion temperature in the pilot diffusion combustion zone 20 for controlling the production of oxides of nitrogen in the combustor 10. One may appreciate that the material being injected into the pilot diffusion combustion zone 20 does not necessarily have to be water, but may be any fluid (liquid or gas) that will reduce the peak firing temperature in the pilot diffusion combustion zone 20. While water is the only commercially practical fluid envisioned for use in this application at this time due to cost effectiveness and ease of handling, one may appreciate that other fluids may be used, for example a fuel having a lower heat value than the primary fuels 22, 28 combusted in the engine, a non-combustible gas other than oxygen, or a chilled fluid. By injecting water into only a portion of the combustor, particularly that portion where the flame temperature is at a maximum value, the impact of a given volume of water on the production of oxides of nitrogen may be maximized.

The water injection system 56 includes a water conduit 58 connected to the pilot fuel nozzle 30 for delivering a flow of water 60 to the pilot diffusion combustion zone 20 and not to the pre-mixed combustion zone 18. The pilot nozzle 30 includes the necessary fluid flow connections (not shown) for mixing the flow of water 60 with the flow of pilot fuel 28 for injecting a mixture 62 of the water and fuel into the diffusion flame zone 20. A water injection control signal 64 may be provided to water injection system 56 to control the flow of water 60 to achieve a desired impact upon the combustion conditions in the pilot diffusion combustion zone 20. For example, controller 46 may include executable instructions for initiating the flow of water 60 only when the combustor 10 is being operated above a predetermined power level, such as 65% or 70% of full rated power, and/or for automatically terminating the flow of water 60 if the power level drops below a predetermined level. Controller 46 may also permit the initiation of pilot water injection only when the gas turbine engine 12 is operating under steady state conditions, and not during a transient loading condition. Controller 46 may also include an operator-selected on-off setting for the water injection function.

It is possible to initiate and terminate the flow of water 60 to the pilot diffusion combustion zone 20 without changing other engine operating parameters. For a typical gas turbine engine of the type sold by the assignee of the present invention and having a power output range of about 215 MW to 300 MW, a water injection flow rate of about 7–10 gallons per minute (gpm) may be used to reduce the production of NOx by more than 5 ppm, depending on the load condition, without adversely impacting combustor stability under most operating conditions. The inventor has determined that it is even more advantageous to first increase the pilot fuel fraction of the combustor 10 before initiating the flow of water 60. For the typical engine described above, the normal pilot fuel fraction may vary from about 3% to about 8% as the engine power increases from 70% to 100% of rated full power. By increasing the pilot fuel fraction by about 1–2% above normal prior to the initiation of pilot water injection, an increased flow rate of water 60 may be used without adversely impacting the stability of combustion. Such increased water flow may decrease the production of NOx by as high as 10 ppm depending upon the operating load.

In one embodiment, controller 46 may be programmed to control fuel system 44 to provide a baseline pilot fuel fraction that varies as a function of operating load as a percentage of full rated power. The following table is one example of such a function, with the values in the specific ranges varying linearly between the extremes of the respective range.

TABLE 1

| % Load | Pilot Fuel Fraction |
|---|---|
| to 50% | 0.250 |
| 50 to 60% | 0.250–0.120 |
| 60 to 70% | 0.120–0.052 |
| 70 to 80% | 0.052–0.050 |
| 80 to 90% | 0.050–0.046 |

TABLE 1-continued

| % Load | Pilot Fuel Fraction |
|---|---|
| 90 to 97% | 0.046–0.042 |
| above 97% | 0.040 |

These values represent a fundamental curve for pilot stage fuel fraction. It is also known to change the pilot fuel fraction by a value that varies with the temperature of the ambient air 36. Such a temperature compensation value may also be determined from a function such as:

TABLE 2

| Temperature ° F. | Pilot Fuel Fraction Increase |
|---|---|
| below −5 | 0.012 |
| −5 to 5 | 0.012–0.010 |
| 5 to 20 | 0.010–0.008 |
| 20 to 30 | 0.008–0.006 |
| 30 to 40 | 0.006–0.005 |
| 40 to 45 | 0.005–0.004 |
| 45 to 50 | 0.004–0.003 |
| 50 to 60 | 0.003–0.002 |
| above 60 | 0.001 |

The temperature compensation value from Table 2 is additive to the fundamental value obtained from Table 1. Thus, for a gas turbine engine 12 operating at 85% power at an ambient temperature of 70° F., the normal pilot fuel fraction without pilot water injection would be 0.046+0.001=0.047. Controller 46 may further be programmed to determine an increment in pilot fuel fraction that is implemented prior to the initiation of the flow of water 60. Such an increment may be obtained from a function such as:

TABLE 3

| % LOAD | PILOT FUEL FRACTION INCREASE |
|---|---|
| 70 up to 80 | 0.018 |
| 80 up to 90 | 0.018–0.015 |
| 90 up to 98 | 0.015–0.010 |
| 98 up to 103 | 0.010–0.009 |
| 103 and above | 0.008 |

For the example above of a gas turbine engine 12 operating at 85% power at an ambient temperature of 70° F., the pilot fuel fraction would be increased from the normal value of 0.047 to a value of 0.047+0.015=0.062 just prior to the initiation of pilot water injection. This change in pilot fuel fraction may be implemented gradually, such as in increments of 0.002 or 0.003 every 20 seconds. When pilot water injection is initiated by operator action or by automatic control, controller 46 first provides an appropriate fuel system control signal 54 to the fuel system 44 to increase the pilot fuel fraction by an appropriate amount, such as by the value determined from Table 3. Once combustion has stabilized at the new pilot fuel fraction conditions, typically after about 30 seconds, controller 46 provides an appropriate water injection control signal 64 to the water injection system 56 to initiate the flow of water 60. One may appreciate that the control scheme for these systems may include system-specific features, such as the actuation of a water injection pump (not shown) isolated from the combustor 10 by closed valves upon the receipt of a pilot water injection initiation signal. Once the pump pressure has stabilized, a control valve (not shown) may be opened to initiate the flow of water 60. The flow rate of water 60 is preferably ramped upward slowly, such as at a rate of 0.25 gpm every 30 seconds, to a predetermined flow rate that provides optimal NOx reduction without destabilizing the combustion process. The water flow rate may further be determined by controller 46 as a function of the full rated power of the combustor 10, such as by the following function.

TABLE 4

| % FULL LOAD | PILOT WATER INJECTION (GPM) |
|---|---|
| up to 65% | 0.0 |
| 65 up to 70% | 0.0–5.0 |
| 70 up to 98% | 5.0–6.0 |
| over 98% | 7.0 |

Note that these flow rates are significantly less than the 98.3 gpm flow rate taught in the example described in prior art U.S. Pat. No. 4,160,362. This small amount of water provided only to the pilot diffusion combustion zone 20 and not to the pre-mixed combustion zone 18 will have a significant beneficial impact on the overall production of oxides of nitrogen by the combustor 10. Preliminary testing has indicated that NOx emissions of below 12 ppm may be achieved at full rated power on a Siemens Westinghouse Power Corporation W501 FD I, W501 FD II or W501 D5A engine with a water/total fuel mass flow ratio of about 0.035, and a water/pilot fuel ratio of about 0.5.

When pilot water injection is terminated during normal operation either by the operator or by automatic action, the flow rate of water 60 may be ramped downward gradually, such as at a rate of 0.5 gpm every 30 seconds. This may be accomplished by closing throttle valves or other appropriate control scheme. Water injection pumps may be stopped once the flow of water to the combustor has terminated. Once the flow of water 60 has reached zero, the bias in the pilot fuel fraction can be reversed, again preferably in steps of perhaps 0.1%, or over a predetermined time period such as 120 seconds.

Controller 46 may be programmed to continuously monitor the power level of the gas turbine 12 and to adjust the flow rate of pilot injection water 60 accordingly. Should the combustor 10 drop below the set point for water injection termination, the flow of water should be reduced to zero promptly, such as at a rate of 2.0 gpm every 30 seconds. Once the flow of water 60 has stopped, the pilot fuel bias of Table 3 should be re-set to zero. A dead band, such as 3% power, should be established between the set points for pilot water injection initiation and pilot water injection termination to avoid unnecessary cycling of the pilot water injection system 56. In the event of a trip (emergency shutdown) of the gas turbine 12, the flow of water 60 to the pilot should also be immediately terminated, and the pilot fuel bias re-set to zero for subsequent plant start-up activities.

Controller 46 may also be provided with a humidity signal 66 from an ambient air humidity sensor 68. Humidity sensor 68 may be a relative humidity sensor for example, or other combination of sensors that allow the moisture content of the ambient air 36 to be determined. Because the water 60 injected into the pilot diffusion flame zone 20 is additive to the water contained in the ambient air 36, it may be advantageous to further control the flow of pilot injection water 60 in response to a level of humidity in the ambient air. Controller 46 may utilize a function table as follows to determine a decrease in the pilot water flow rate as a function of humidity.

TABLE 5

| RELATIVE HUMIDITY | PILOT WATER INJECTION FLOW RATE DECREASE (gpm) |
| --- | --- |
| 0–10% | 0.0–0.3 |
| 10–20% | 0.3–0.7 |
| 20–30% | 0.7–1.0 |
| 30–40% | 1.0–1.2 |
| 40–70% | 1.2–1.8 |
| 70–100% | 1.8–2.5 |

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A gas turbine engine having a dual-mode combustor comprising:
    a pre-mixed combustion zone disposed downstream of a first fuel delivery element;
    a diffusion combustion zone disposed downstream of a second fuel delivery element;
    a water injection apparatus for selectively injecting water into only the diffusion combustion zone and not the pre-mixed combustion zone for controlling combustion temperature in the diffusion flame zone;
    a fuel system for supplying fuel through said fuel delivery elements to said pre-mixed combustion zone and said diffusion combustion zone, a pilot fuel fraction being a ratio of a fuel flow rate provided to the pilot diffusion combustion zone divided by a sum of the fuel flow rate provided to the pilot diffusion combustion zone plus a fuel flow rate provided to the pre-mixed combustion zone; and
    a controller operatively connected to the fuel system and comprising logic for increasing the pilot fuel fraction prior to initiating the operation of the water injection apparatus to selectively inject water into only the diffusion combustion zone.

2. The gas turbine engine of claim 1, further comprising:
    a pilot fuel nozzle disposed in the dual-mode combustor for providing a flow of fuel to the diffusion combustion zone; and
    the water injection apparatus comprising a water conduit connected to the pilot fuel nozzle for selectively delivering a flow of water to the diffusion combustion zone and not the pre-mixed combustion zone.

3. The gas turbine engine of claim 1, further comprising a sensor for providing a signal responsive to a level of humidity in ambient air provided to the gas turbine engine, the water injection apparatus being responsive to the signal to control a flow rate of the water injected into only the diffusion combustion zone as a function of the level of humidity.

4. A method for controlling combustion of a fuel in a gas turbine engine having a pre-mixed zone of combustion downstream of a first fuel delivery element and a pilot diffusion zone of combustion downstream of a second fuel delivery element, the method comprising selectively injecting a fluid other than the fuel into only the pilot diffusion combustion zone and not the pre-mixed combustion zone, the fluid being injected into the pilot diffusion combustion zone only when the gas turbine engine is operating above a predetermined power level.

5. A method for controlling combustion of a fuel in a gas turbine engine having a pre-mixed zone of combustion downstream of a first fuel delivery element and a pilot diffusion zone of combustion downstream of a second fuel delivery element, the method comprising selectively injecting a fluid other than the fuel into only the pilot diffusion combustion zone and not the pre-mixed combustion zone, the fluid being injected into the pilot diffusion combustion zone only when the gas turbine engine is operating at a steady-state power level and not in a power transient condition.

6. A method for controlling combustion of a fuel in a gas turbine engine having a pre-mixed zone of combustion downstream of a first fuel delivery element and a pilot diffusion zone of combustion downstream of a second fuel delivery element, the method comprising selectively injecting a fluid other than the fuel into only the pilot diffusion combustion zone and not the pre-mixed combustion zone, and increasing a pilot fuel fraction of the combustor by a predetermined increment above a baseline value prior to initiating the selective injection of fluid into only the pilot diffusion combustion zone.

7. The method of claim 6, further comprising calculating the predetermined increment as a function of an operating power level of the combustor.

* * * * *